May 21, 1929. H. DRAGON 1,714,004
DOUGH KNEADING MACHINE
Filed Sept. 10, 1927
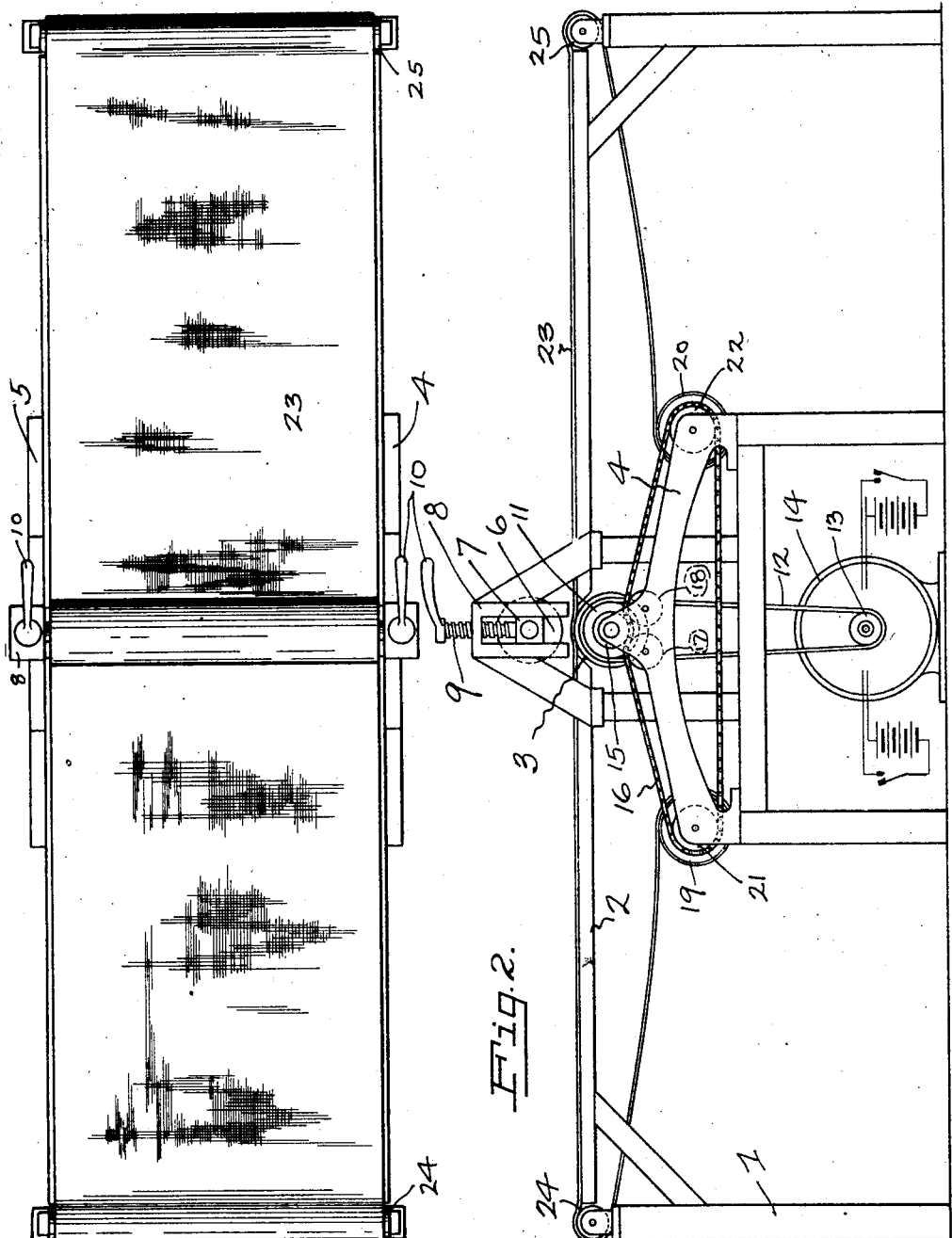
INVENTOR
HIPPOLYTE DRAGON
By
Attorney Patented May 21, 1929.

1,714,004

UNITED STATES PATENT OFFICE.

HIPPOLYTE DRAGON, OF SAN FRANCISCO, CALIFORNIA.

DOUGH-KNEADING MACHINE.

Application filed September 10, 1927. Serial No. 218,681.

This invention relates particularly to an apparatus for mechanically kneading or rolling dough.

An object of the invention is to provide a dough kneading machine consisting of a pressure roller and a fabric covered platen adapted to be advanced relative to the roller, to pass the dough to be kneaded between the roller and the platen.

A further object of the invention consists of providing a pair of rollers arranged in spaced relation and a fabric belt, to carry the dough to be kneaded through and between the rollers, movable in opposite directions relative thereto and a pre-determined distance on opposite sides thereof.

A still further object of the invention relates to an apparatus for kneading dough that consists of a surface having a metal roller rotatably mounted in spaced relation thereabove, and a fabric belt to move between and to carry the dough to be kneaded between the roller and surface, the belt being covered with an absorbent powder to prevent the adhesion of the dough thereto when kneaded by the roller.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 is a plan view of a dough kneading machine constructed in accordance with my invention.

Fig. 2 is a side elevation of Fig. 1.

In detail, the construction illustrated in the drawings comprises a table or frame 1 having a relatively flat horizontal upper surface 2. A drive roller 3 is arranged on a horizontal axis transversely across the table surface 2, said roller 3 having a side thereof projecting above the upper face of a mediate portion of the table surface. The opposite ends of the roller 3 are rotatably journaled in supporting members 4 and 5 respectively, arranged on opposite sides of the table 1.

An idle roller 6 has its opposite ends journaled in slides 7 movably mounted in guides 8 arranged on opposite sides of the table surface, and above the level thereof. An adjusting screw 9, to be rotated by a handle 10, engages each of the slides 7 to adjust the horizontally disposed roller 6 parallelly relative to the drive roller 3. One end of the roller 3 is provided with a pulley 11 thereon around which a drive belt 12 passes, said drive belt being connected to the driving pulley 13 on a driving motor 14. The motor 14 is connected to a source of electrical energy, and, in combination with a pair of operating switches, is driven in either a clockwise or contra-clockwise direction, whereby the direction of rotation of the drive roller 3 may be varied at will. A sprocket wheel 15 is provided on the extreme outer end of the roller 3, to mesh with a sprocket chain 16. The sprocket chain 16 is held in engagement with the sprocket wheel 15 by a pair of idler sprockets 17 and 18 rotatably mounted on the frame 4 contiguous to the sprocket 15.

A pair of roller reels 19 and 20 are rotatably journaled at their opposite ends in the frame members 4 and 5 below the table surface 2. The roller reels 19 and 20 are provided with sprocket wheels 21 and 22 thereon around which the sprocket chain 16 passes.

A fabric belt 23, preferably made of canvas, is passed over the upper surface of the table 2, and drive roller 3. Opposite ends of the canvas belt 23 pass around guide rollers 24 and 25 arranged at opposite ends of the table surface 2 and each of the respective ends of the canvas 23 are wrapped around the respective reel rollers 19 and 20. The reel rollers 19 and 20 are so connected by the sprocket chain to the drive roller 3 that the belt may be selectively moved, in opposite directions, over the table surface to wind from one reel roller to the other, and vice versa. The movement of the belt 23 is always in one direction, or the other, over the table surface relative to the driven and idler compression rollers.

The belt has the interstices thereof thoroughly saturated with flour or some other absorbent material having an affinity for the dough to be kneaded, by preventing the said dough from adhering to the surface of the canvas. The mass of dough to be kneaded is laid on the belt, and the belt moved toward the rollers to force the dough mass between the rollers and gradually flatten the said dough out by the time the entire body thereof has passed through the rollers. The operator then takes the sheet of flattened dough and rolls it into a mass, and starts the canvas moving in the opposite direction to pass the dough mass back between the rollers to roll it flat again. The action of continuously passing the dough mass back and forth on the canvas underneath the compression rollers to effect the desired kneading thereof, continues as long as desired.

I have arranged the electrical apparatus that actuates the canvas belt to move a predetermined distance in opposite directions over the table surface and then to come to an absolute stop, thus requiring the operator to start the machine for each movement of the canvas belt in either direction. Although I have shown a canvas belt moving over a stationary surface, I do not wish to be limited exclusively to that construction, as it would be clearly within the scope of the invention to pass a fabric covered platen having the dough mass thereon beneath a compressing roller.

Having thus described this invention, what I claim and desire to secure by Letters Patent is:

1. In combination a pair of rollers arranged in spaced parallel alignment; means to adjust the rollers toward or from each other, a fabric belt to carry dough to be kneaded between the rollers, and means engaging the opposite ends of the belt for reciprocating the belt between the rollers.

2. In combination a pair of rollers arranged in spaced parallel alignment; means to adjust the rollers toward or from each other; a fabric belt to carry dough to be kneaded between the rollers; and means for synchronously driving one of the rollers and alternately reeling the opposite ends of the fabric belt, thereby reciprocating the belt between the rollers.

3. In combination a frame having a flat upper surface; a pair of rollers arranged transversely across said frame surface in adjusted parallel relation midway between the ends thereof; a fabric belt movable lengthwise over the table surface to carry dough to be kneaded between the rollers; and means to synchronously drive one of the rollers and alternately reel the opposite ends of the fabric belt.

4. In combination a frame having a flat upper surface; a pair of rollers arranged transversely across said frame surface in adjusted parallel relation midway between the ends thereof; a fabric belt movable lengthwise over the table surface to carry dough to be kneaded between the rollers; and means to alternately reel the opposite ends of the belt so as to move the belt in alternate opposite directions, over the table surface, relative to the rollers.

5. In combination a frame having a flat upper surface; a roller arranged in spaced relation above the level of said surface; and a fabric belt reciprocable between the frame surface and roller to repeatedly carry dough to be kneaded through and between the roller and surface, and means to alternately reel the opposite ends of said fabric belt so as to move the belt in opposite directions a predetermined distance on opposite sides of the roller.

6. An apparatus for kneading dough comprised of a surface having a metal cylinder rotatably mounted in spaced relation thereabove, a fabric belt, and means to alternately reel the opposite ends of said belt so as to reciprocate the same between and to repeatedly carry the dough to be kneaded between the cylinder and surface, said belt being covered with an absorbent to prevent the adhesion of the dough thereto when kneaded by the roller.

7. An apparatus for kneading dough comprised of a frame; a pair of rollers arranged transversely across the frame in adjusted parallel relation; a fabric belt movable between the rollers for carrying dough thereon; reels for reeling the opposite ends of the belt; and reversible means to change the direction of rotation of said reels, thereby reciprocating said belt between said rollers.

8. An apparatus for kneading dough comprised of a frame; a pair of rollers arranged transversely across the frame in adjusted parallel relation; a fabric belt movable between the rollers for carrying dough thereon; reels for reeling the opposite ends of the belt; and reversible means to rotate one of said rollers and to rotate said reels in opposite directions in synchronism with said rollers, thereby reciprocating said belt between said rollers.

9. An apparatus for kneading dough comprised of a frame having a flat surface; a fabric belt movable over said flat surface for carrying dough; a roller adjustably mounted above said belt; a second roller rotatably mounted below said belt; reels for alternately reeling the opposite ends of the belt, said reels being operatively connected to said second roller so as to be rotated in synchronism therewith; and reversible means for rotating said second roller so as to reciprocate said fabric belt to a predetermined distance on opposite sides of the said rollers.

10. In combination a frame having a flat upper surface; a roller arranged in spaced relation above the level of said surface; a fabric belt movable between the frame surface and the roller for carrying dough to be kneaded through and between the roller and the surface; reels on the frame for reeling the opposite ends of the fabric belt, and reversible means for changing the direction of rotation of said reels so as to reciprocate said fabric belt to a predetermined distance on opposite sides of the said roller.

In testimony whereof, I have hereunto set my hand at San Francisco, California, this 3rd day of August, 1927.

HIPPOLYTE DRAGON.